United States Patent [19]

Takahashi

[11] Patent Number: 4,907,024

[45] Date of Patent: Mar. 6, 1990

[54] AUTOMATIC FOCUS ADJUSTING APPARATUS EFFECTING TEMPORARY HIGH-SPEED FOCUSING

[75] Inventor: Kimihide Takahashi, Tokyo, Japan

[73] Assignee: Fuji Photo Film Co., Ltd., Kanagawa, Japan

[21] Appl. No.: 253,591

[22] Filed: Oct. 5, 1988

[30] Foreign Application Priority Data

Oct. 8, 1987 [JP] Japan .................. 62-252555

[51] Int. Cl.$^4$ .................................. G03B 3/00
[52] U.S. Cl. .......................... 354/400; 354/403; 352/140; 358/227
[58] Field of Search ............. 354/400, 402, 403; 352/140; 358/227

[56] References Cited

U.S. PATENT DOCUMENTS

| | | | |
|---|---|---|---|
| 3,936,187 | 2/1976 | Momose | 354/403 |
| 4,309,098 | 1/1982 | Shenk | 352/140 |
| 4,550,994 | 11/1985 | Maruyama | 354/402 |
| 4,745,425 | 5/1988 | Kusaka | 354/400 |
| 4,772,909 | 9/1988 | Ogasawara | 354/400 |

*Primary Examiner*—Russell E. Adams
*Attorney, Agent, or Firm*—Birch, Stewart, Kolasch & Birch

[57] ABSTRACT

An automatic focus adjusting apparatus of a camera in which an object is shot by use of an imaging lens having a variable focus. The apparatus includes a distance measuring unit for measuring a distance between the object and the camera, an adjusting device for adjusting the focus of the imaging lens, an operating unit for entering an instruction directing an automatic focusing operation, and a control unit responsive to a result of a measurement effected by the distance measuring unit and the instruction entered by the operating unit for controlling the adjusting unit. The control unit in an ordinary case controls the distance measuring unit at a first predetermined interval of time to cause the distance between the camera and the object to be measured, controls the adjusting device in response to the distance measured to cause the focus of the imaging lens to be adjusted at a first predetermined speed, and repeatedly effects controlling of the distance measuring unit and adjusting device at the first predetermined interval of time until the imaging lens is focused on the object. The control unit controls, when the automatic focus instruction is entered by the operating unit, the distance measuring unit to measure the distance between the object and the camera and the adjusting device to adjust the focus of the imaging lens at a second predetermined speed higher than the first predetermined speed.

7 Claims, 4 Drawing Sheets

AUTOMATIC FOCUS ADJUSTING APPARATUS EFFECTING TEMPORARY HIGH-SPEED FOCUSING

BACKGROUND OF THE INVENTION

1. Field of the Invention

The present invention relates to a camera, and in particular, to an automatic focus (AF) adjusting apparatus thereof.

2. Description of the Prior Art

For an automatic focusing mechanism or an automatic focus adjusting apparatus in an imaging apparatus, such as a video camera, there have been developed such various methods for use in the automatic focus adjusting apparatus as an active method in which a radiation such as an infrared light or an ultrasound is irradiated onto an object for a distance measurement, and a passive method in which the focus is adjusted on the basis of a contrast signal attained from a video signal representing an image of the objective field. In these automatic focusing mechanisms, there has been a problem that when an obstacle such as a person or a car temporarily passes a way between a camera including the automatic focusing mechanism and an object to be shot during an operation of the automatic focusing mechanism, the focus point of the imaging system moves from the object to the obstacle. This problem is in general solved through an adoption of a designing technique in which the sensitivity the automatic focusing mechanism is lowered. In consequence, when a user of the camera desires to attain a focused state of an object at a high speed, the automatic focusing operation having such a slow response becomes to be insufficient, which leads to a problem that the focusing mode of the camera is required to be switched from the automatic focusing mode to the manual mode so as to manually adjust the focus on the object.

SUMMARY OF THE INVENTION

It is therefore an object of the present invention to provide an automatic focus adjusting apparatus of a camera which is capable of effecting an automatic focusing operation at a high speed at a desired point of time without establishing the focused condition on an obstacle.

According to the present invention, there is provided an automatic focus adjusting apparatus for use in a camera in which an object is shot by means of an imaging lens having a variable focus comprising distance measuring means for measuring a distance between the object and the camera, adjusting means for adjusting the focus of the imaging lens, operating means for entering an instruction directing an automatic focusing operation, and control means responsive to a result of a measurement effected by said distance measuring means and the instruction entered by said operating means for controlling said adjusting means, wherein said control means ordinarily controls the distance measuring means at a first predetermined interval of time to cause the distance between the camera and the object to be measured, controls the adjusting means in response to the distance measured to cause the focus of the imaging lens to be adjusted at a first predetermined speed, and repeatedly effects controlling of the distance measuring means and adjusting means at the first predetermined interval of time until the imaging lens is focused on the object, and when the instruction directing the automatic focusing operation is entered by the operating means, the distance measuring means to measure the distance between the object and the camera and the adjusting means to adjust the focus of the imaging lens at a second predetermined speed higher than the first predetermined speed.

BRIEF DESCRIPTION OF THE DRAWINGS

The objects and features of the present invention will become more apparent from the following detailed description taken in conjunction with the accompanying drawings in which.

DESCRIPTION OF THE PREFERRED EMBODIMENT

Figure 1:
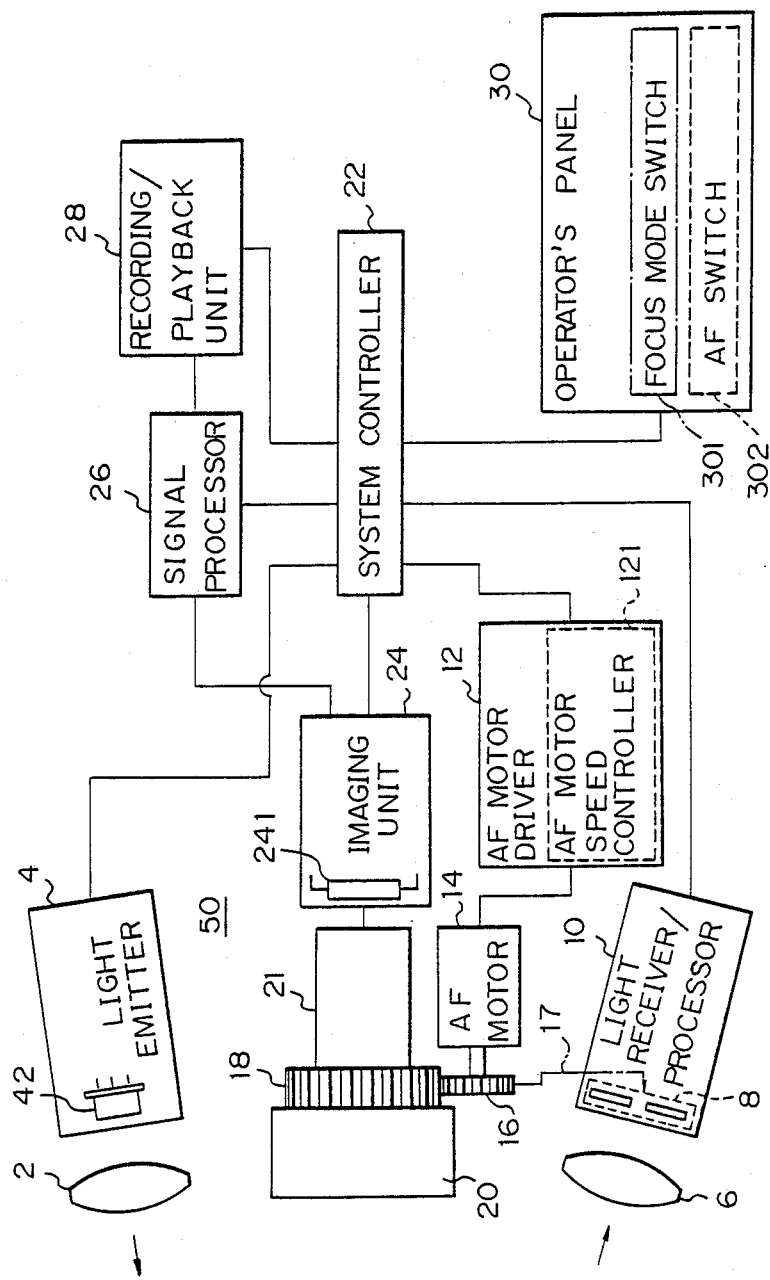
FIG. 1 is a functional block diagram schematically showing the system configuration of an embodiment of a video camera having a video recorder integrated therein using an automatic focus adjusting apparatus according to the present invention.

Referring now to the drawings, description will be given in detail to an embodiment of an automatic focusing mechanism according to the present invention.

In FIG. 1, there is shown an overall system configuration of a video camera having a video recording apparatus integrated therein, which utilizes an infrared radiation distance measuring method, as an embodiment according to the present invention. Basically, the camera includes a focus adjusting unit 50 mainly having components such as an optical lens system 21 and an infrared ray distance measuring mechanism, an imaging unit 24 including an image sensor 241 such as a CCD unit, a signal processor 26 for effecting processing on a video signal developed from the imaging unit 24 and an audio signal received by a microphone or audio signal input terminal (not shown) and a recording/playback unit 28 for recording under the control of a system controller 22 the video and audio signals on a video tape and for reproducing the video and audio signals thus recorded on the video tape.

Incidentally, the automatic focusing mechanism adopted in the camera of this embodiment operates according to the trigonometric measurement method. More specifically, the mechanism is of a so-called active method in which a near infrared radiation emitted from an infrared light-emitting diode, LED, 42 is applied through a light emission lens 2 onto an object such that part of the infrared radiation reflected on the object is received via a light reception lens 6 by a 2-element photosensitive device 80 so as to produce an electric signal representative of a difference of the intensity of the light received by the 2-element photosensitive device 8, thereby energizing an automatic focus motor 14 to adjust the focus distance of the imaging lens 21.

An automatic focus light emitting unit 4 includes a light-emitting diode such as the infrared ray LED 42 which is adapted to intermittently emit the infrared radiation modulated with a frequency of about 10 KHz under the control of the system controller 22. Incidentally, the frequency of the infrared radiation of the automatic focusing in this example may be that employed in the conventional automatic focusing operation. A light receiver/processor 10 comprises an optical sensor 8 having an optical filter and a photodiode, an amplifier, a band-pass filter, and a comparator, not shown.

The infrared radiation of the modulation frequency of about 10 KHz emitted from the light emitter 4 is delivered via the light emission lens 2, and reflected on the object to be received via the light reception lens 6 by the light receiver/processor 10. The light receiver/processor 10 includes the 2-element photosensitive device 8 of which has a light receiving inlet oriented to an objective field. The photosensitive device 8 is constituted, as conceptually indicated with an arrow 17 of dot-and-dash line in FIG. 1, to be cooperative with a link member 16 of the automatic focus motor 14 such that the direction in which the device 8 receives the light is aligned in any case to locate the imaging lens 21 at its focus position where the focused condition is established.

The light receiver/processor 10 converts a received light into an electric signal associated therewith and limits of the frequency band of the electric signal, thereby extracting a signal necessary for the automatic focusing operation. The automatic focusing mechanism disposed in the camera of this embodiment employs the 2-element photosensitive device 8, and the light receiver/processor 10 effects in a comparing unit included therein a comparing operation of the infrared radiation received by the 2-element photosensor 8 so as to determine the positional relationship associated with the focus distance of the imaging lens 21 with respect to the object, thereby notifying the system controller 22 of the resultant relationship. More specifically, the light receiver/processor 10 determines, when the direction in which the 2-element photosensor 8 receives the light is deviated from the object, a difference between two signals attained from the photosensor 8. The difference is related to a shift from a focused state of the imaging lens 21, and a signal representing the difference is supplied to the system controller 22.

The automatic focus motor drive circuit 12 drives the motor 14 under the control of the system controller 22. In addition, the automatic focus motor driver 12 includes an automatic focus motor speed control circuit 121, which sets the rotational rate of the motor 14 according to an instruction from the system controller 22, for example, to either one of two speed steps, which are associated with a "normal rotation" speed, and a "higher rotation" speed exceeding the normal rotation speed. The automatic focus motor 14 is driven by the motor drive circuit 12 so as to operate an automatic focus ring 20 by means of link members 16–18 such as gear wheels, thereby moving the optical lens system 21 in its forward or backward direction along the optical axis thereof.

The operating unit or operator's panel 30 is disposed on an external surface of a housing of the camera and includes operation switches such as a recording/playback switch (not shown) a focus mode switch 301 to be used to specify the automatic focusing mode or the manual focusing mode, and a one-touch automatic focus switch 302 which, while being depressed, causes the response speed of the automatic focusing mechanism 50 to be increased. Those switches may be manually operated by the user of the camera to cause the system controller 22 to be responsive to the connection positions of the respective switch.

The imaging section 24 includes various mechanisms necessary for the imaging operation, which are, for example, a solid-state imaging device such as a CCD, an automatic white balance adjustment, and an iris control so as to adjust the amount of an incident light from the objective field under the control of the system controller 22, for example. Imaging section 24 is also adapted to convert an optical image of the objective field produced through the lens 21 into a video signal.

The system controller 22 sends, in order to adjust the focus distance of the imaging lens 21 depending on a result from the comparison operation achieved by the light receiver/processor 10, an automatic focus motor control signal to the automatic focus motor drive circuit 12. In addition, when the one-touch automatic focus switch 302 of the operating unit 30 is operated, in order to increase the focusing speed of the automatic focusing mechanism 50, a control signal for setting a motor speed to the automatic motor speed control 121 is supplied to the motor drive 12, and the light emission interval of time of the light-emitting diode 42 of the light emitter 4 is also controlled to be shortened. Moreover, the system controller 22 is responsive to a state of a switch of the operating unit 30 for directing the recording or playback operation, for example, so as to send control signals to the respective sections of the components such as the signal processor 26 and the recording/playback unit 28, thereby controlling those sections.

Referring now to the flowchart of FIG. 2, description will be given of the operation of the system controller 22 in the apparatus of this embodiment. When the user of the camera conducts an operation on the operating unit 30 and the focusing mechanism is resultantly set to a state ready for operation, the system controller 22 first determines whether or not the focusing mode switch 301 of the operating unit 30 is at the position of the automatic focus (step 202). If this is the case, control is transferred to a focusing operation flow of step 204, FIG. 3, to achieve the automatic focusing operation.

At step 202, if the focusing mode switch 301 is not at the position of the automatic focusing, namely, in the state of the manual focusing, the system controller 22 determines whether or not the one-touch switch 302 of the operating unit 30 is actuated (step 206). If this is the case, the system controller 22 sets, in order to drive the motor 14 at its higher speed, the speed associated with the "high rotation" to the automatic motor speed control 121 of the motor drive 12 (step 208). Thereafter, control is transferred to the focusing operation flow of step 210, FIG. 3.

At step 210, when the focused state is established for the lens 21 as a result of the focusing operation, the system controller 22 controls the motor drive 12 and sets, in order to cause the motor 14 to be driven at the ordinary speed, the speed of the "normal rotation" to the motor speed control 121, thereby completing the operation. In consequence, the intervals of the emission of the infrared radiation from the light emitter 4 and the distance measuring operation of the light receiver/processor 10 are minimized.

Figure 3:
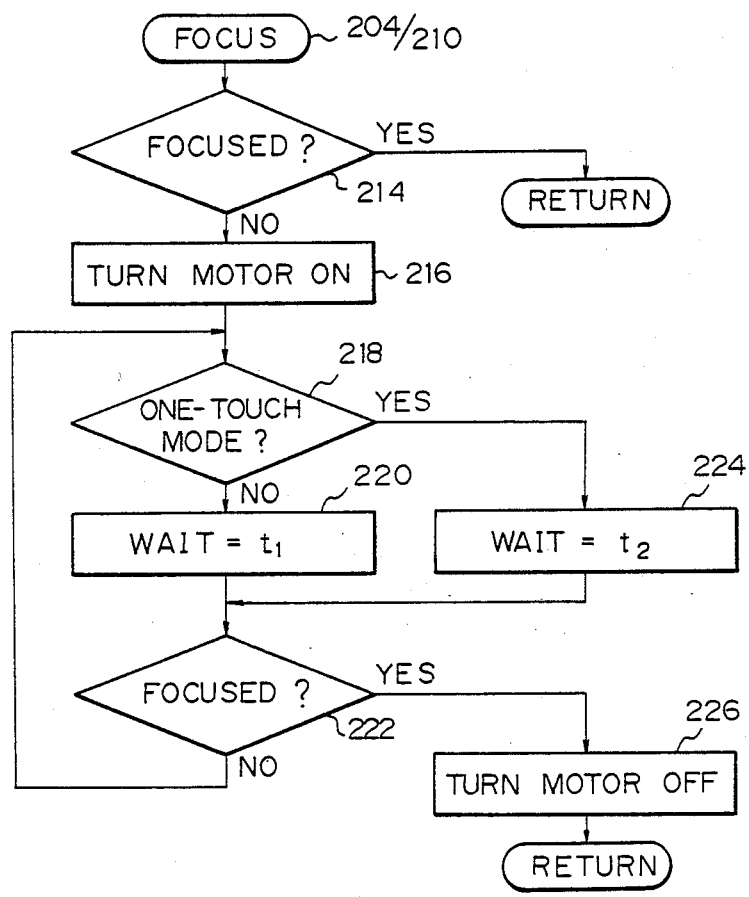

Referring now to FIG. 3, description will be given of the focusing operation flow. This flow is a so-called subroutine flow and hence can be initiated by either an automatic focusing operation and a focusing operation caused by the one-touch automatic focus switch 302.

In the focusing operation flow, the system controller 22 first controls the light emitter 4 so as to cause the infrared radiation LED 42 to emit an automatic focus infrared radiation having a modulation frequency of 10 KHz in this example. The emitted infrared radiation is irradiated via the light emission lens 2 onto an object so as to be reflected on the object. The reflected light is received via the light reception lens 6 by the 2-element photosensitive device 8 of the light receiver/processor 10. The infrared radiation thus received by the photosensor 8 is converted by the light receiver/processor 10 into electric signals respectively associated with the two elements thereof. The two electric signals are passed through components such as a bandpass filter and then undergo a comparing operation, thereby transmitting a signal indicating a difference therebetween to the system controller 22. Based on the difference signal supplied from the light receiver/processor 10, the system controller 22 determines whether or not the lens 21 is in the focused state thereof (step 214).

Figure 2:
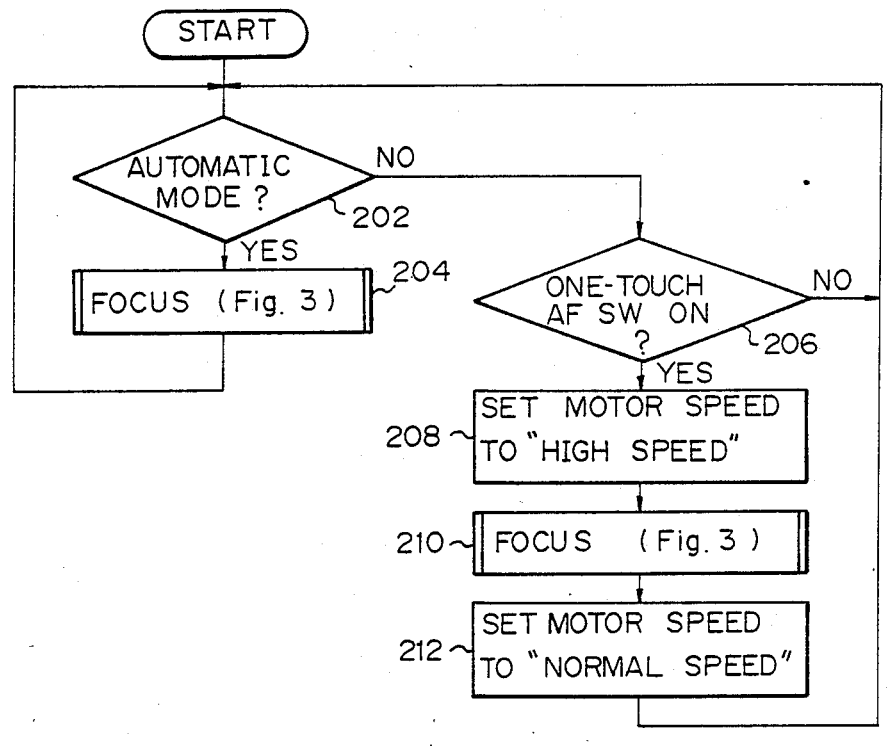
FIGS. 2 and 3 are flowcharts showing focusing operation examples of the apparatus of FIG. 1.

At step 214, if the lens 21 is in its focused state, namely, the value of the difference signal is substantially null, control returns to step 210 or 204 of FIG. 2. If the focused state has not been established yet, namely, if there is attained a substantially significant difference signal, the system controller 22 controls the automatic focus motor drive 12 to operate the motor 14 (step 216). In the operation of the routine of step 210, since the automatic focus motor speed control 121 is beforehand set to the "high rotation" in step 208, the automatic focus motor 14 is set to the high-speed drive; whereas, in the operation of the routine of step 204, the motor 14 is set to the ordinary-speed drive associated with a rotary speed lower than that of the high-speed drive.

Next, the system controller 22 determines whether or not the operation flow is in the one-touch mode (step 218). Incidentally, the reason for the provision of step 218 judging for a decision of the one-touch mode is that the focus operation flow of FIG. 3 is a subroutine flow as described above and is hence the common operation flow to be also effected for the automatic focus operation.

At step 218, when it is found that the one-touch mode is set, the system controller 22 loads an internal timer of the controller 22 with a wait time t2 which is shorter than a wait time t1 for the ordinary automatic focus operation, and then initiates the internal timer. When the timer is interrupted at its time-out thereof due to a lapse of the period of time t2, the processing proceeds from step 224 to step 222. In addition, if the system is found not to be in the one-touch mode at step 218, the wait time t1 associated with the ordinary automatic focusing operation is set to the timer, and thereafter control is passed to step 222 in response to a time-out of the timer (step 220).

At step 222, the focusing operation of step 214 is effected. More specifically, the operations ranging from the light emission of the light emitter 4 to the comparison operation between the attained signals in the light receiver/processor 10 are performed, thereby determining whether or not the focused condition has been established for the lens 21. If this is the case at step 222, the system controller 22 controls the automatic focus motor drive 12 to stop the operation of the automatic focus motor 14 (step 226), and then control is returned to step 210 or 204 of FIG. 2. In addition, if the focused condition has not been established, the motor drive circuit 12 is controlled to continue driving the motor 14.

Figure 4:
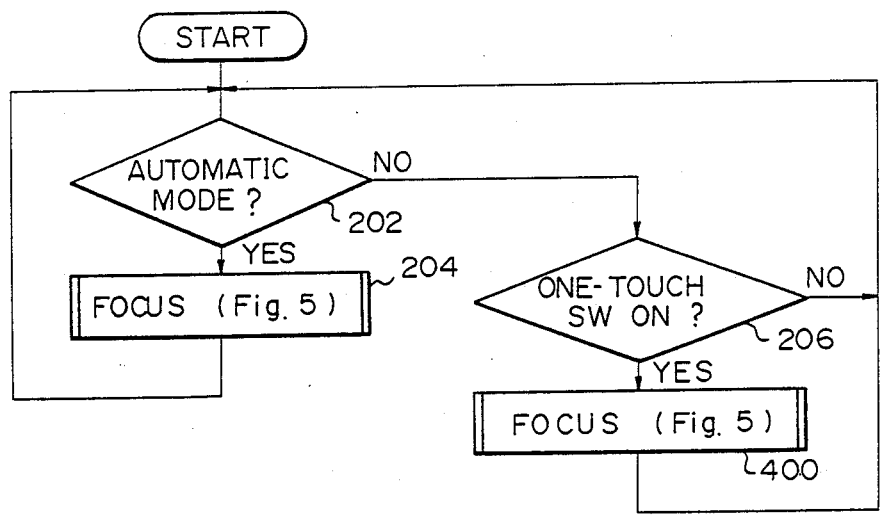
FIGS. 4 and 5 are flowcharts showing examples of the focusing operation of an apparatus having the conventional focus function.
Figure 5:
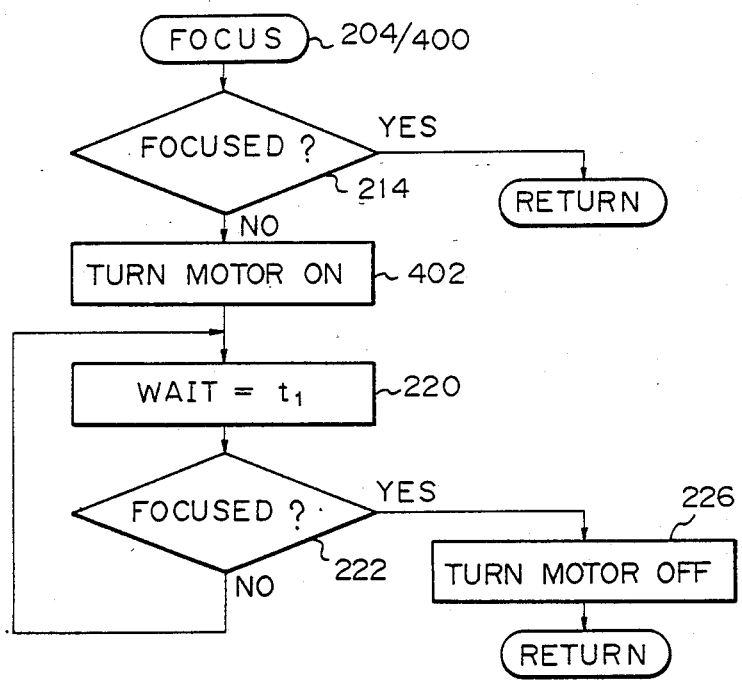

For reference, FIGS. 4 and 5 show flowcharts of an example of the automatic focusing operations in a conventional camera. The automatic focusing mechanism of the prior art includes, similar to that of the present invention, an automatic focus mode and a manual focus mode, and for the manual mode, there is disposed a one-touch switch. For the focusing operation in the one-touch switch mode, the system achieves an operation of the routine as shown in the flowchart of FIG. 5 such that the operation is completed when the focused state of the lens is attained in step 222.

The conventional one-touch switch is disposed to be used merely in a case where the focus is desired to be temporarily fixed on an arbitrary object, for example, and as can be seen from the operation flowcharts of FIGS. 4 and 5, in the focus operation due to the one-touch switch, step 400, FIG. 4, there is achieved only once the operation of the routine (the operation flow of FIG. 5) completely similar to the focusing operation in the automatic focus mode, step 204, FIG. 4. In consequence, the response speed of the focusing operation caused by the one-touch switch is identical to that of the automatic focus operation, and this response speed is insufficient in general.

However, in the apparatus according to the present invention, the operating unit 30 includes a one-touch automatic focus switch 302 such that when the user of the camera operates the switch 302, the system controller 22 controls the automatic focus motor speed control circuit 121 to cause the automatic focus motor 14 to be driven at a high speed and further controls the light emitter 4 to effect a light emission of the infrared radiation LED 42 at an interval of time shorter than that used in the ordinary automatic focusing operation with a consequence of the enhanced response speed of the focusing operation. As a result, when the operator of the camera desires to shoot an object such as a moving object, the focused state can be easily established for the object at a high speed.

Although the one-touch automatic focus switch 302 of this embodiment is designed such that the automatic focusing mechanism is operated while the switch 302 is being depressed, the apparatus may naturally be configured, like the conventional apparatus in the restricted sense, such that the automatic focusing mechanism operates only once when the switch 302 is depressed. In addition, the system may also be adapted such that the one-touch automatic focus switch 302 comprises a pair of switches such that the automatic focusing mechanism continuously operates while one of the switches is being operated and that the automatic focusing mechanism operates only once when the other of the switches is depressed.

Furthermore, although a 2-element photosensitive device is adopted in the automatic focusing mechanism in the camera of the illustrative embodiment, the present invention is also applicable to an automatic focusing mechanism employing other methods, such as a method in which a sole photosensitive device is used together with a light emitting device adapted to mechanically sweep the beam emitted therefrom, or a method in which a plurality of photosensitive devices are arranged for an electronic scan.

In addition, in conjunction with the apparatus of the illustrative embodiment, description has been given to an example in which the present invention is applied to an active method using the infrared radiation. However, the present invention is also applicable to an automatic focusing mechanism of other methods such as a passive method in which the focus is adjusted depending on a contrast signal extracted from an image signal produced by the imaging system.

Incidentally, in this embodiment, although the automatic focus adjusting apparatus according to the present invention is applied to a video camera having a recording apparatus integrated therein, the present invention is not restricted by the video camera of this type but may naturally be applied to a video camera of a type separated from a video recorder, as well as to a video camera in which other than of a video tape, namely, a magnetic disk is adopted as the recording medium. In addition, the present invention may also be applied to other cameras such as an electronic still camera including an automatic focusing function, a movie camera of a silver-halide photosensitive film type, and a still camera of the same type. Moreover, the present invention may also be applied to a camera which directly delivers a signal to a monitor without using a recording medium such as a video tape.

According to the present invention, in response to an entered automatic focus instruction, distance measuring means is controlled to measure a distance to an object such that the focus of an imaging lens is adjusted at a speed higher than an ordinary adjusting speed depending on a result from the measurement.

Consequently, in the ordinary operation mode, the apparatus is not responsive to an obstacle temporarily appearing in the objective field, and only in a case where a high speed focusing operation is required, for example, when an object such as a moving object is to be shot, the focused state can be easily established for the intended object at a high speed.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What I claim is:

1. An automatic focus adjusting apparatus for use in a camera in which an object is shot by means of an imaging lens having a variable focus comprising:
    distance measuring means for measuring a distance between the object and the camera;
    adjusting means for adjusting the focus of the imaging lens;
    operating means for manually entering an instruction directing an automatic focusing operation; and
    control means, responsive to a result of a measurement effected by said distance measuring means and the instruction entered by said operating means, for controlling said adjusting means;
    said control means controlling, during the absence of the instruction, said distance measuring means at a first predetermined interval of time to cause said distance measuring means to measure the distance between the camera and the object, controlling said adjusting means in response to the distance measured to cause the focus of the imaging lens to be adjusted at a first predetermined speed, and repeatedly effecting controlling over said distance measuring means and adjusting means at the first predetermined interval of time until the imaging lens is focused on the object;
    said control means controlling, in response to the instruction directing the automatic focusing operation entered by said operating means, said distance measuring means to measure the distance between the object and the camera, and said adjusting means to adjust the focus of the imaging lens at a second predetermined speed which is higher than the first predetermined speed.

2. An automatic focus adjusting apparatus in accordance with claim 1, wherein said control means causes, when the instruction directing the automatic focusing operation is entered by said operating means, distance measurement of said distance measuring means and focus adjustment of said adjusting means to be repeatedly achieved at a second predetermined interval of time, shorter than the first predetermined interval of time, until said imaging lens is focused on the object.

3. An automatic focus adjusting apparatus in accordance with claim 2, wherein said control means effects, in response to a single instruction directing the automatic focusing operation entered by said operating means, the distance measurement of said measuring means and the focus adjustment of said adjusting means.

4. An automatic focus adjusting apparatus in accordance with claim 2, wherein said control means causes, so long as there exists a supply of the instruction directing the automatic focusing operation from said operating means, the distance measurement of said distance measuring means and the focus adjustment of said adjusting means to be repeatedly achieved at the second predetermined interval of time.

5. An automatic focus adjusting apparatus in accordance with claim 1, wherein said distance measuring means comprises:
    radiation emitting means for emitting a radiation to an objective field including the object;
    radiation receiving means for receiving a portion of the radiation reflected from the object; and
    driving means for changing a direction of a radiation receiving orientation of said radiation receiving means in association with a focusing operation of said imaging lens;
    said radiation receiving means supplying said control means as the result of the measurement with a signal representing a deviation of the direction of the radiation receiving orientation with respect to the object.

6. A camera comprising:
    imaging means including an imaging lens having a variable focus for shooting an object through the imaging lens;
    distance measuring means for measuring a distance between the object and said camera;
    adjusting means for adjusting the focus of the imaging lens;
    operating means for manually entering an instruction directing an automatic focusing operation; and
    control means responsive to a result of a measurement effected by said distance measuring means and the instruction entered by said operating means for controlling said adjusting means;
    said control means controlling, during absence of the instruction, said distance measuring means at a first predetermined interval of time to cause said distance measuring means to measure the distance between said camera and the object, controlling said adjusting means in response to the distance measured to cause the focus of the imaging lens to be adjusted at a first Predetermined rate, and repeatedly effecting controlling over said distance measuring means and adjusting means at the first predetermined interval of time until the imaging lens is focused on the object;

said control means controlling, in response to the instruction entered by said operating means, said distance measuring means to measure the distance between the object and said camera, and said adjusting means to adjust the focus of the imaging lens at a second predetermined rate which is higher than the first predetermined rate.

7. A camera in accordance with claim 6 wherein said imaging means shoots an objective field through the imaging lens to produce a video signal representing the objective field, said camera further comprising recording means for recording the produced video signal on a recording medium.

* * * * *